US010088084B2

(12) United States Patent
Anderson

(10) Patent No.: US 10,088,084 B2
(45) Date of Patent: Oct. 2, 2018

(54) FLANGED FITTINGS FOR PIPELINE

(71) Applicant: John Anderson, Hawthorne, WI (US)

(72) Inventor: John Anderson, Hawthorne, WI (US)

(73) Assignee: Worldwide Machining & Welding, Inc., Superior, WI (US)

( * ) Notice: Subject to any disclaimer, the term of this patent is extended or adjusted under 35 U.S.C. 154(b) by 786 days.

(21) Appl. No.: 14/575,601

(22) Filed: Dec. 18, 2014

(65) Prior Publication Data

US 2015/0176731 A1    Jun. 25, 2015

Related U.S. Application Data

(60) Provisional application No. 61/917,631, filed on Dec. 18, 2013, provisional application No. 62/030,859, filed on Jul. 30, 2014.

(51) Int. Cl.
| | |
|---|---|
| *F16L 23/032* | (2006.01) |
| *F16L 23/02* | (2006.01) |
| *F16L 55/11* | (2006.01) |
| *F16L 41/08* | (2006.01) |
| *F16L 41/16* | (2006.01) |

(52) U.S. Cl.
CPC ............ *F16L 23/032* (2013.01); *F16L 23/02* (2013.01); *F16L 55/1108* (2013.01); *F16L 41/084* (2013.01); *F16L 41/16* (2013.01)

(58) Field of Classification Search
CPC ....... F16L 23/02; F16L 23/026; F16L 23/032; F16L 55/1108; F16L 41/084; F16L 41/16
USPC .................................. 285/368, 405, 412, 55
See application file for complete search history.

(56) References Cited

U.S. PATENT DOCUMENTS

| | | | |
|---|---|---|---|
| 3,070,129 A | 12/1963 | Poulallion et al. | |
| 3,155,116 A | 11/1964 | Nooy | |
| 3,329,447 A | 7/1967 | Hitz | |
| 4,058,142 A | 11/1977 | Rankin | |
| 4,100,929 A | 7/1978 | Harrison | |
| 4,401,133 A | 8/1983 | Lankston | |
| 4,579,484 A | 4/1986 | Sullivan | |
| 4,635,162 A | 1/1987 | McLaughlin | |
| 4,691,740 A * | 9/1987 | Svetlik | 285/55 X |
| 4,878,698 A * | 11/1989 | Gilchrist | 285/368 X |
| 5,208,937 A | 5/1993 | Cooper | |
| 5,439,331 A | 8/1995 | Andrew et al. | |
| 5,443,095 A | 8/1995 | Glossop, Jr. | |
| 5,469,881 A | 11/1995 | Phan et al. | |
| 5,531,250 A | 7/1996 | Freeman et al. | |
| 5,560,388 A | 10/1996 | Caldwell | |
| 5,577,776 A | 11/1996 | Welch | |
| 5,660,199 A | 8/1997 | Maichel | |
| 5,676,174 A | 10/1997 | Berneski, Jr. et al. | |
| 5,701,935 A | 12/1997 | Vasudeva | |

(Continued)

*Primary Examiner* — Greg Binda
*Assistant Examiner* — Zachary T Dragicevich
(74) *Attorney, Agent, or Firm* — Kagan Binder, PLLC

(57) ABSTRACT

Flanged fittings with proximal, central, and distal sections between proximal and distal ends, the proximal section including a flange portion with bolt holes, and the central section including curved or angled surfaces, and which provide enhanced structural integrity and function for use in pipeline operations are described. The fittings can include an inner threaded surface capable of receiving a threaded plug to provide a primary seal in the fitting, and then can be capped with a finishing cap at the flange portion following a pipeline tapping process.

18 Claims, 18 Drawing Sheets

(56) References Cited

U.S. PATENT DOCUMENTS

| | | |
|---|---|---|
| 5,752,690 A | 5/1998 | Ellett |
| 5,883,303 A | 3/1999 | Bliss et al. |
| 5,904,377 A | 5/1999 | Throup |
| 5,967,168 A | 10/1999 | Kitani et al. |
| 5,975,142 A | 11/1999 | Wilson |
| 6,116,285 A * | 9/2000 | Wilson ................ F16L 55/1108 |
| 6,286,553 B1 | 9/2001 | Morgan |
| 6,364,371 B1 * | 4/2002 | Mckay ................ F16L 23/032 |
| | | 285/368 X |
| 6,367,313 B1 | 4/2002 | Lubyk |
| 6,502,867 B2 | 1/2003 | Holmes, IV et al. |
| 6,675,634 B2 | 1/2004 | Berneski, Jr. et al. |
| 6,705,350 B2 | 3/2004 | Lee |
| 7,134,454 B2 | 11/2006 | Montminy |
| 7,353,839 B2 | 4/2008 | Calkins et al. |
| 7,523,962 B2 | 4/2009 | Wright et al. |
| 7,546,847 B2 | 6/2009 | Morrison et al. |
| 7,604,217 B2 | 10/2009 | Lum |
| 7,841,364 B2 | 11/2010 | Yeazel et al. |
| 7,891,639 B2 | 2/2011 | Wiecek et al. |
| 7,909,065 B2 | 3/2011 | Aleksandersen et al. |
| 8,171,961 B2 | 5/2012 | Koyama |
| 8,342,209 B2 | 1/2013 | Hasunuma |
| 8,505,585 B2 | 8/2013 | Cox |
| 2003/0127848 A1 * | 7/2003 | Campbell ................ 285/368 X |
| 2013/0032238 A1 * | 2/2013 | Butler ................ F16L 55/11 |
| | | 285/405 X |

* cited by examiner

FLANGED FITTINGS FOR PIPELINE

CROSS-REFERENCE TO RELATED APPLICATIONS

The present non-provisional Application claims the benefit of commonly owned provisional Applications having Ser. No. 61/917,631, filed on Dec. 18, 2013, entitled FLANGED FITTING FOR PIPELINE, and Ser. No. 62/030,859, filed on Jul. 30, 2014, entitled FLANGED FITTING FOR PIPELINE, which Applications are incorporated herein by reference in its entirety.

FIELD OF INVENTION

The invention is directed to flanged fittings for pipelines.

BACKGROUND

Flanged fittings are used for a variety of purposes in rigid piping systems. For example, in hot tapping operations a fitting can be welded to the pipeline at a location where the tap is to be made. The fitting can extend radially from the pipeline. After the fitting with flange is attached, a tapping valve can be attached to the flange and a tapping machine can then be mounted on the tapping valve. After the tapping operation is complete, the tapping machine can be removed from the tapping valve and replaced with a plugging machine to provide a non-permanent plug which blocks flow of material being transported through the pipeline so that maintenance can be performed on the pipeline. Following maintenance, the non-permanent plug can be withdrawn from the pipeline and replaced with a permanent plug which is positioned in the fitting. To complete the operation, a blind flange is connected to the flanged fitting on the pipeline.

Flanged fittings may also be used in line stop assemblies in operations where it is desired to temporarily prevent fluid flow through a selected pipeline section, such as to provide maintenance or modifications a downstream pipeline section. In a line stop assembly a pipeline sleeve can be first mounted or clamped over a target segment of the pipeline. A flanged fitting can be attached to the pipeline through the pipeline sleeve to extend radially from the pipeline. Next, a temporary valve can be attached to the flanged fitting and the pipeline can be tapped. After the tapping process, a completion plug can be secured in the flanged fitting, the temporary valve can be removed, and a blind flange connected to the flanged fitting.

Many flanged fittings have a "T" shape with a circular flange portion, a tubular neck portion with a distal end that can be attached to a pipeline, and a central bore extending through the flange and neck portions. Depending on the mode of attachment of the flange to the pipeline, it may be desired to modify the flange, such as by welding additional metal pieces to the neck of the fitting. However, such constructions may not be suitable for use in pipeline operations as the modifications may result in structural problems and cause the fitting to fail.

SUMMARY

The invention provides flanged fittings with improved features that provide enhanced structural integrity and function for use in pipeline operations.

The flanged fitting has proximal, central, and distal sections between proximal and distal ends of the fitting. The proximal section includes a flange portion having a circumference, and proximal, vertical, and distal surfaces, and a plurality of bolt holes extending from proximal to distal surface of the flange portion, circumferentially arranged in the flange portion. The flange has a central opening extending from its proximal to distal end, with a central axis, and an inner surface.

In some embodiments, the central section has a tubular shape and in a proximal to distal arrangement: a first angled outer surface defining a first section of fitting wall between the inner surface that decreases in thickness; a second vertical surface defining a second section of fitting wall between the inner surface that is constant in thickness; and a second angled outer surface defining a third section of fitting wall between the inner surface that increases in thickness. The central section further includes a first curved transition surface between the first angled outer surface and the second outer vertical surface, and a second curved transition surface between the second outer vertical surface and the second angled outer surface.

In other embodiments, the central section has a tubular shape and includes, in a proximal to distal arrangement: a first curved outer surface defining a first section of fitting wall between the inner surface that decreases in thickness; a second vertical surface, parallel to the central axis and defining a second section of fitting wall between the inner surface that is constant in thickness; and a second curved outer surface defining a third section of fitting wall between the inner surface that increases in thickness.

The distal section has a third vertical surface defining a fourth section of fitting wall between the inner surface that is constant in thickness. The fourth section of fitting wall has a thickness that is greater than a thickness of the second section of fitting wall, and the outer diameter of the fourth section of fitting wall is greater than the outer diameter of the second section of fitting wall.

In some embodiments, the inner surface of the flange comprises an inner threaded surface positioned between two inner non-threaded surfaces and capable of receiving a threaded plug.

It has been found that by including first and second curved transition surfaces, or first and second curved outer surfaces, in the central portion of the flange, the flange has better structural integrity, and allows the presence of a bulkier distal end with greater outer diameter and wall thickness.

In other embodiments of the invention, the invention provides systems comprising the flanged fitting, such as a system comprising the flanged fitting along with additional components such as a plug, a blind or capping flange, a pipeline sleeve, or combinations thereof. In other embodiments of the invention, the invention provides a method for accessing a pipeline comprising a step of attaching the flanged fitting to the pipeline.

DETAILED DESCRIPTION

Figure 1:
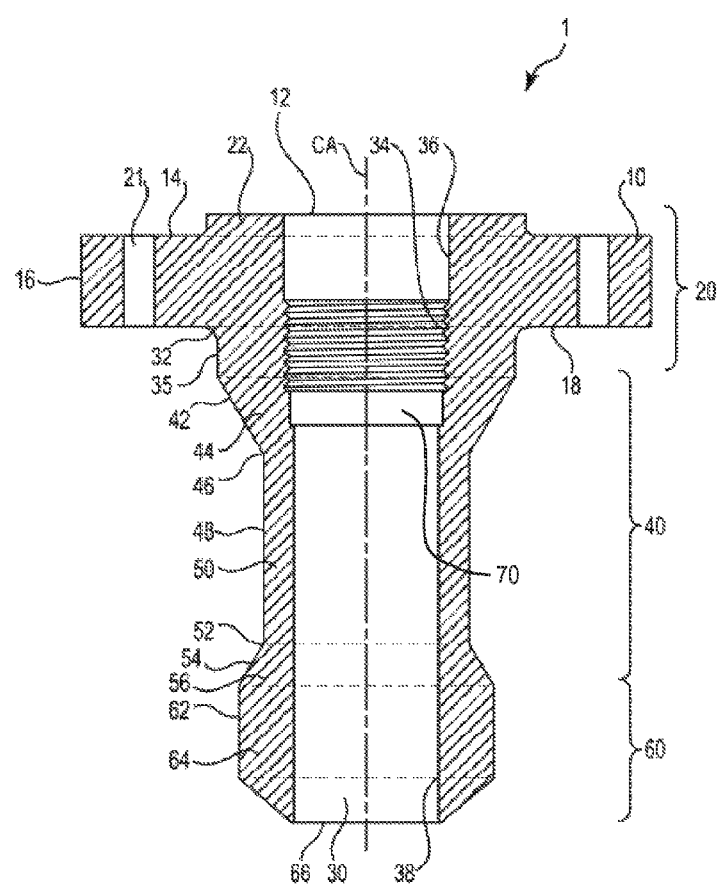
FIG. 1 is a side cross-sectional view of an embodiment of a flanged fitting.
Figure 2:
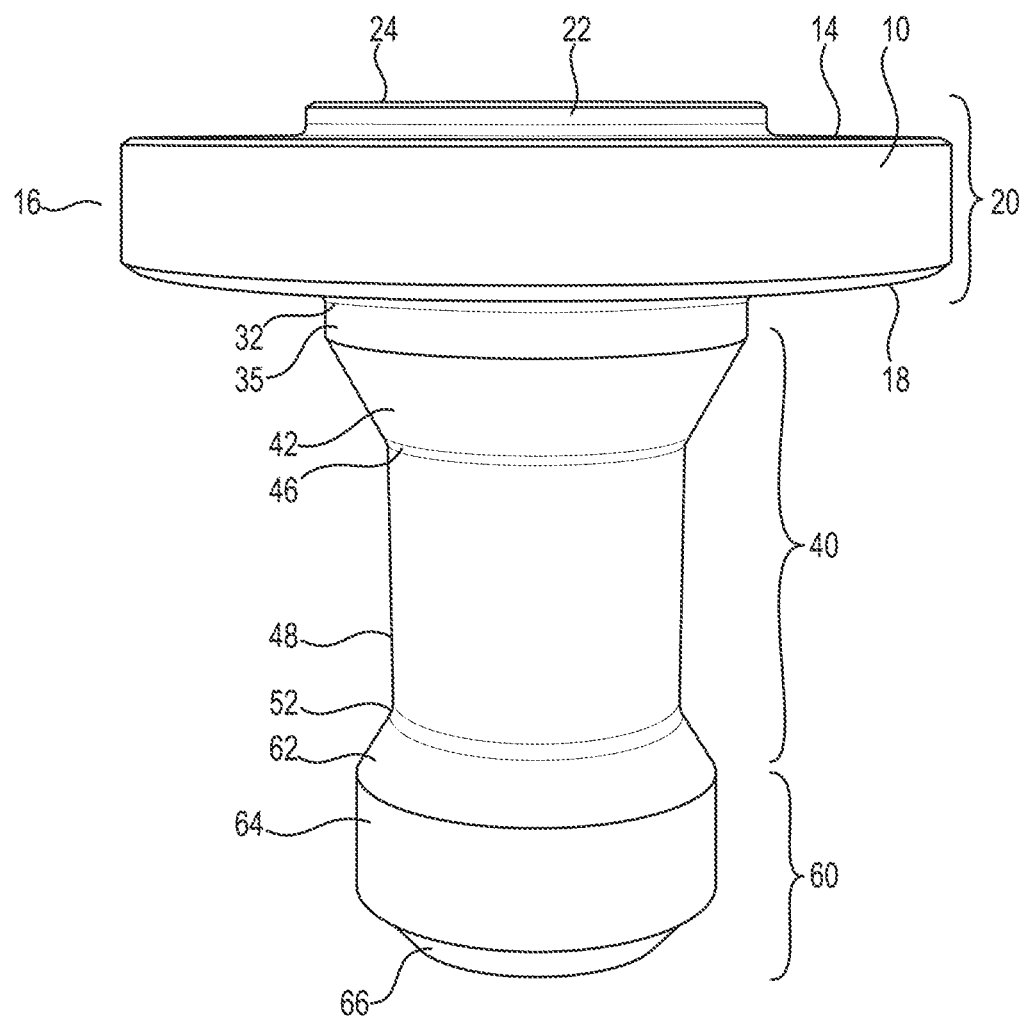
FIG. 2 is a side perspective view of an embodiment of a flanged fitting.

The embodiments of the present invention described herein are not intended to be exhaustive or to limit the invention to the precise forms disclosed in the following detailed description. Rather, the embodiments are chosen and described so that others skilled in the art can appreciate and understand the principles and practices of the present invention.

Embodiments of the invention include flange fittings as illustrated in FIGS. 1-16. With reference to FIGS. 1, 2, 5, and 6, portions of flanged fitting (1, 101, 201) are described with reference to proximal (20, 120, 220), central (40, 140, 240), and distal (60, 160, 260) sections of the fitting. Reference to the arrangement of features of the fitting can be described with reference to the proximal (12, 112, 212) and distal end (66, 166, 266) of the fitting.

The proximal section (20, 120, 220) of the fitting includes flange portion (10, 110, 210). The flange portion includes a proximal surface (14, 114, 214), a vertical surface (16, 116, 216), and a distal surface (18, 118, 218). Extending through the flange portion, as well as the length of the fitting (from the proximal (12, 112, 212) to distal end (66, 166, 266) of the fitting), is a central opening (30, 130, 230) having a central axis CA.

Figure 3:
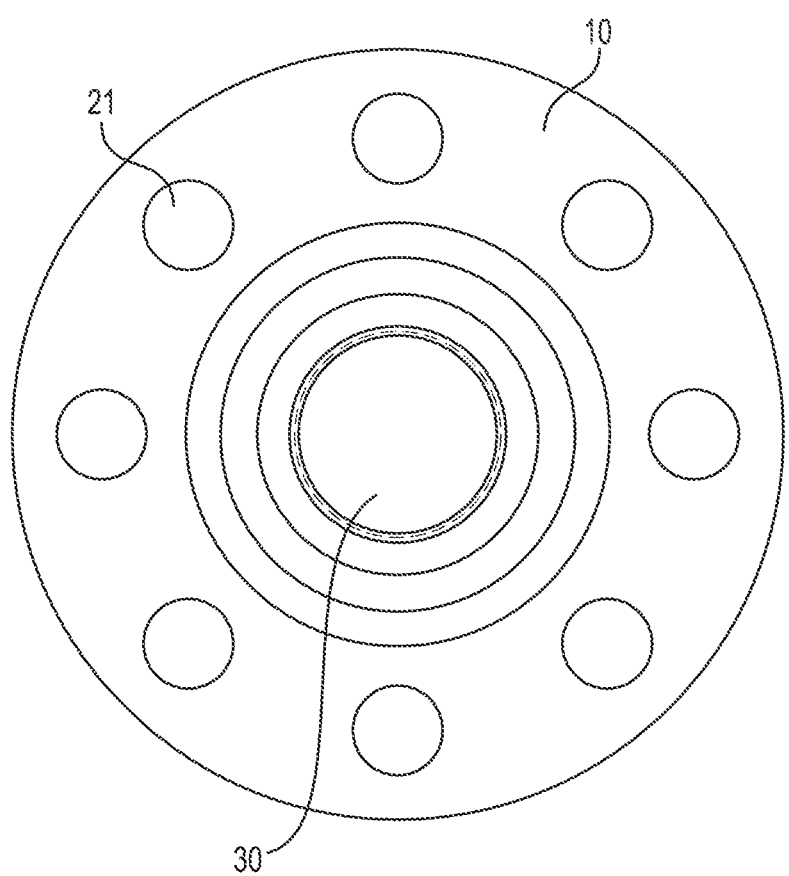
FIG. 3 is a top plan view of an embodiment of a flanged fitting.
Figure 4:
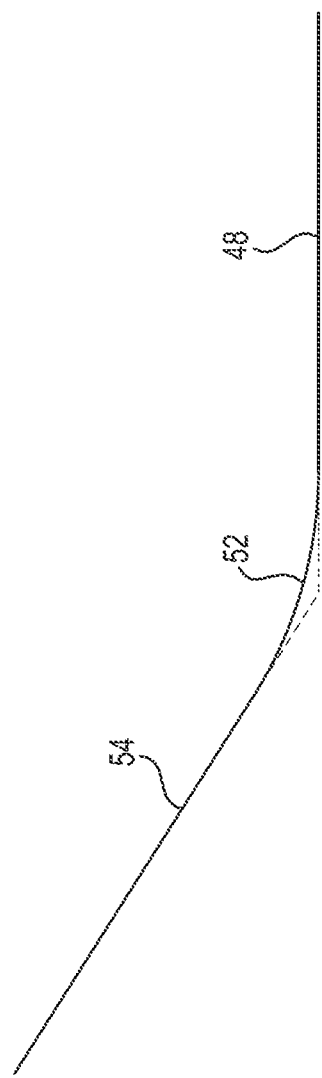
FIG. 4 is a side cross-sectional view a curved transitional surface of a flanged fitting.

A plurality of bolt holes (21, 121, 221) extend through the flange portion from the proximal surface (14, 114, 214) to distal surface (18, 118, 218). FIG. 3 is a top view of an embodiment of the flanged fitting, showing the plurality of bolt holes 21 arranged circumferentially on the flange portion. The number of bolt holes can be chosen based on factors such as the flange size and use, with exemplary bolt hole numbers ranging from about 4 to about 16 (eight bolt holes are shown in FIG. 3).

Dimensions of the flange portion can be chosen based on factors such as the overall fitting size and use of the fitting. In exemplary designs, the flange has a thickness (from proximal surface (14, 114, 214) to distal surface (18, 118, 218)) in the range of about 0.75 inches to about 1.25 inches, such as about 1 inches, and a diameter in the range of about 5 inches to about 8 inches, such as about 6.5 inches. Exemplary bolt hole diameters are in the range of about 0.65 inches to about 0.85 inches, such as about 0.75 inches.

The proximal section (20, 120, 220) of the fitting can also include a raised portion (22, 122, 222) that extends proximally from the flange portion (10, 110, 210) and encompasses the diameter of the central opening (30, 130, 230). The height of the raised portion can be, for example, in the range of about 0.06 inches to about 0.3 inches, about 0.2 inches to about 0.3 inches, such as about 0.25 inches. The raised portion (22, 122, 222) has a circumference that is smaller than the flange circumference, for example, a diameter in the range of about 3 inches to about 4.5 inches, such as about 3.6 inches.

Referring back to FIGS. 1, 5, and 6, the central opening (30, 130, 230) is shown extending from the proximal (12, 112, 212) to distal end (66, 166, 266) of the fitting with the central axis CA running parallel to the inner wall of the opening. As shown in FIG. 3, the central opening has a circular shape when the fitting is viewed from its proximal end (in this embodiment the distal end also has a circular shape; not shown).

Figure 6:
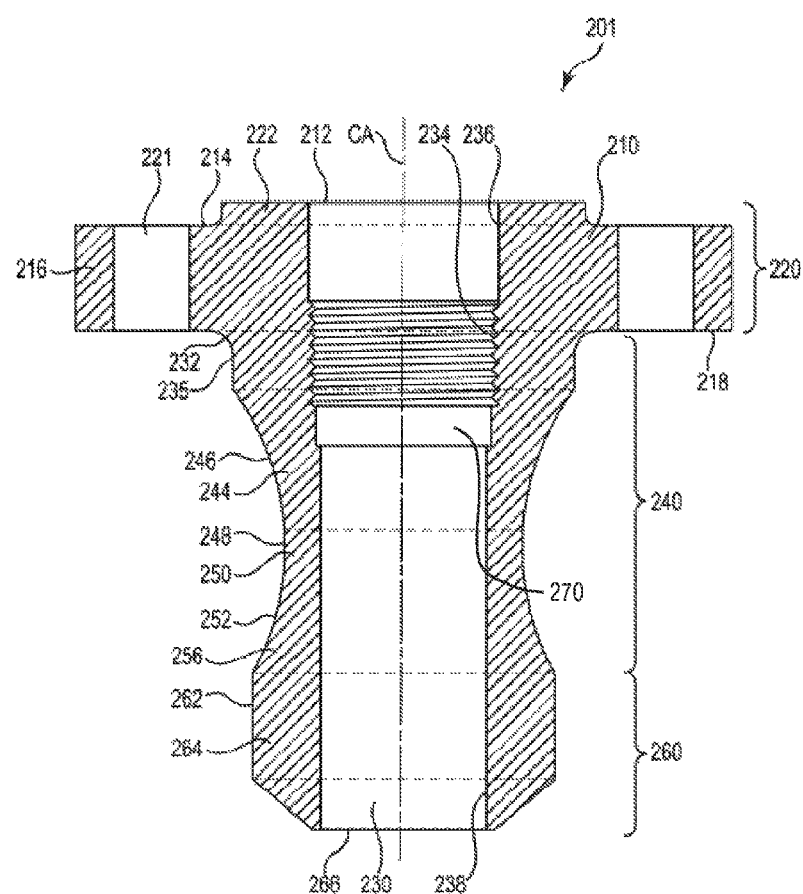
FIG. 6 is a side cross-sectional view of an embodiment of a flanged fitting.
Figure 7:
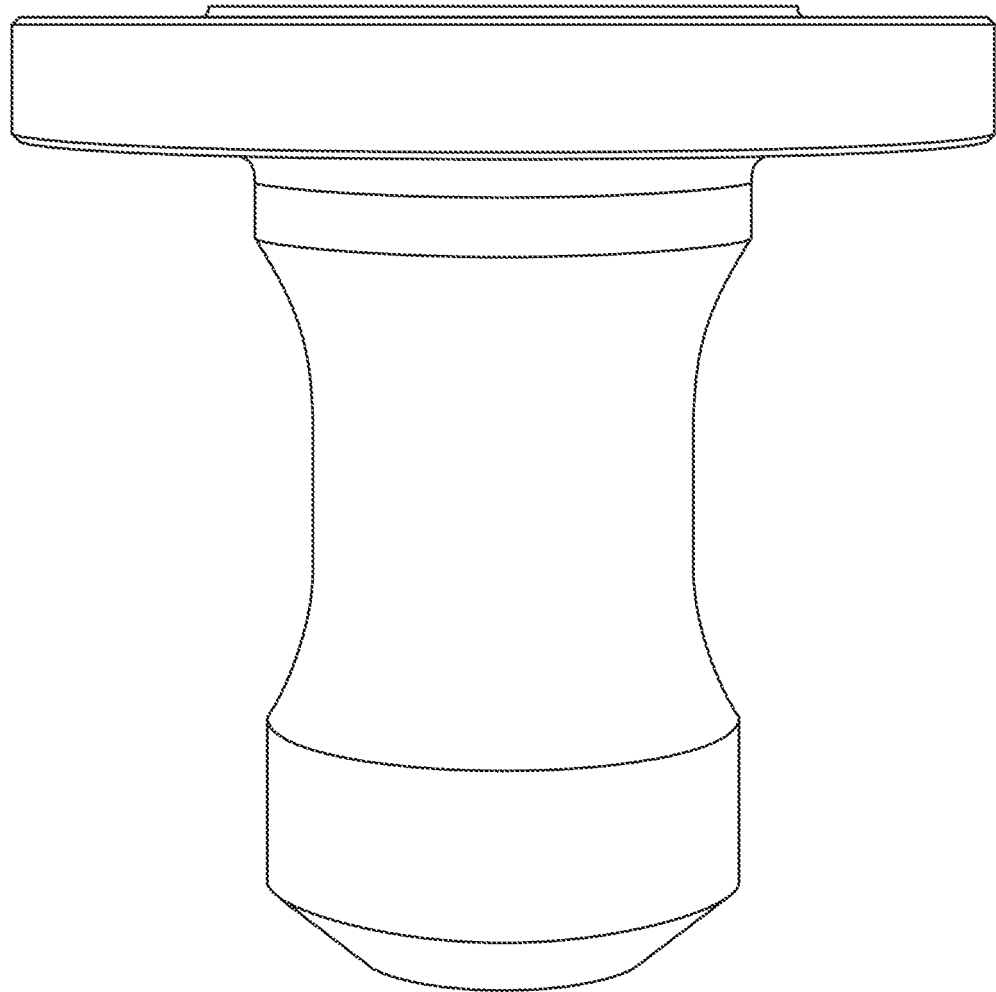
FIG. 7 is a side perspective view of another embodiment of a flanged fitting.
Figure 8:
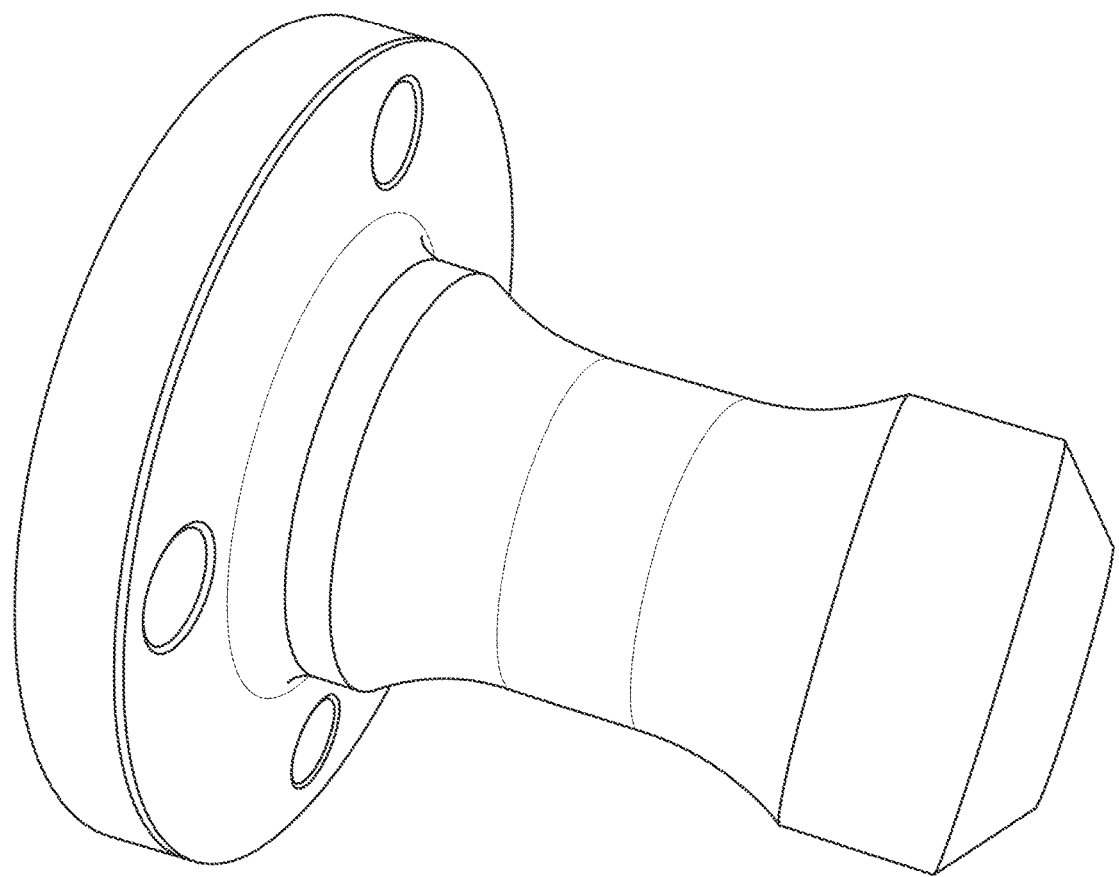
FIG. 8 is another side perspective view of the flanged fitting of FIG. 7.
Figure 9:
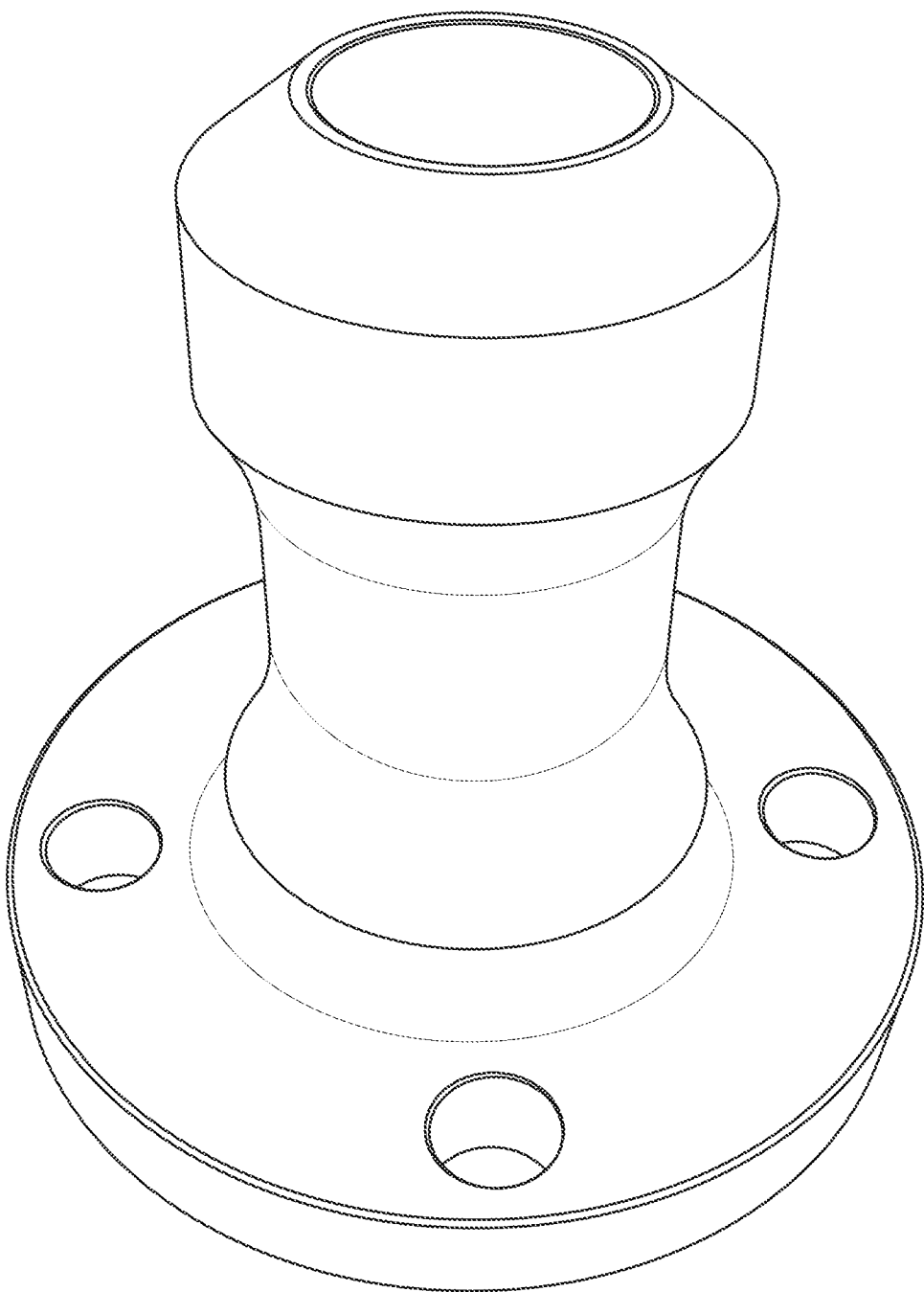
FIG. 9 is a bottom/side perspective view of the flanged fitting of FIG. 7.
Figure 10:
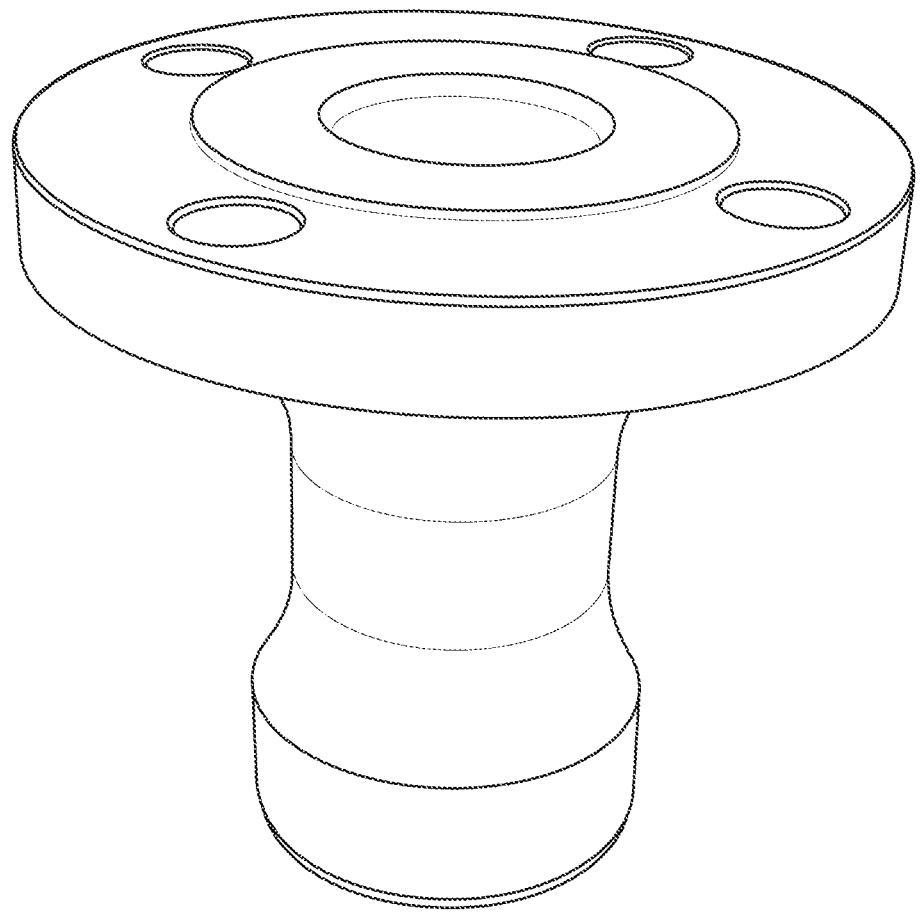
FIG. 10 is a top/side perspective view of the flanged fitting of FIG. 7.
Figure 11:
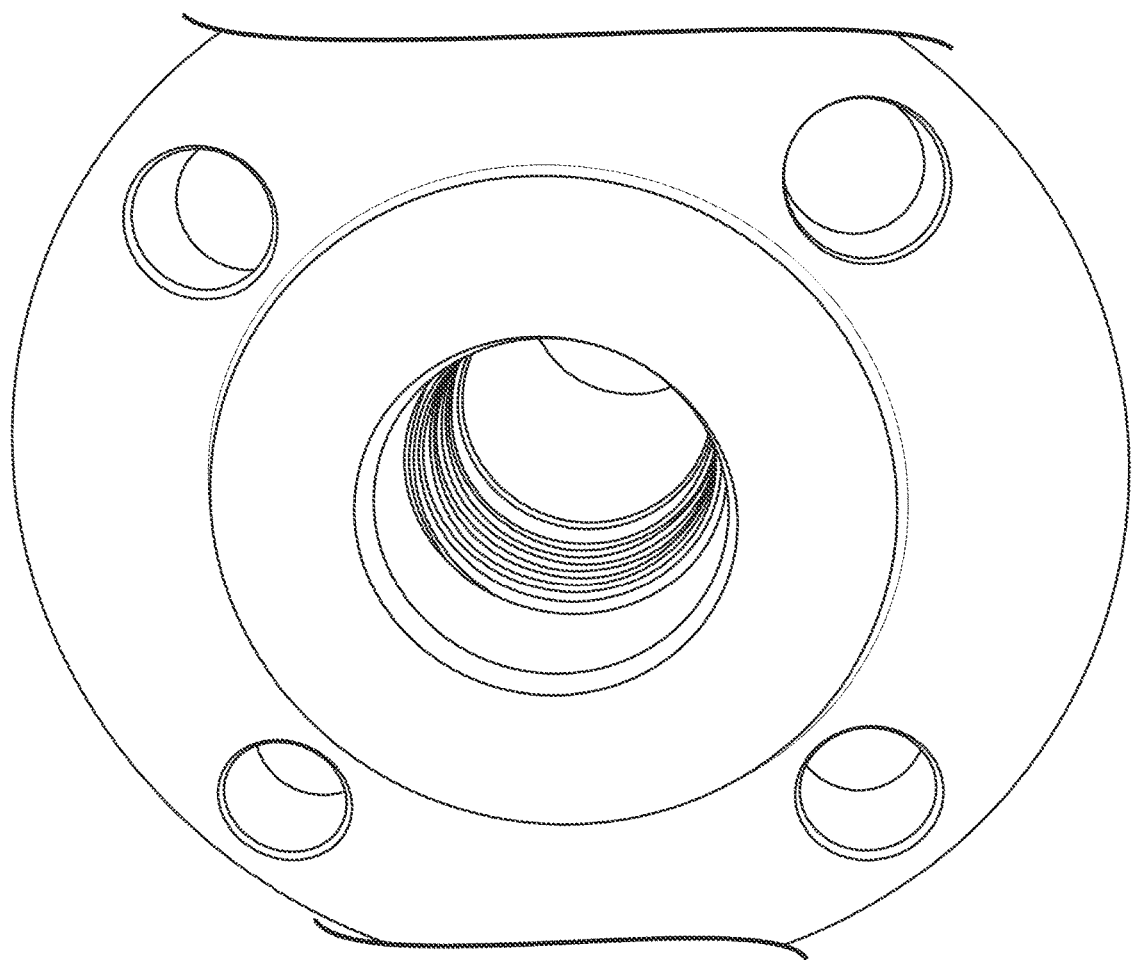
FIG. 11 is a top perspective view of the flanged fitting of FIG. 7.
Figure 12:
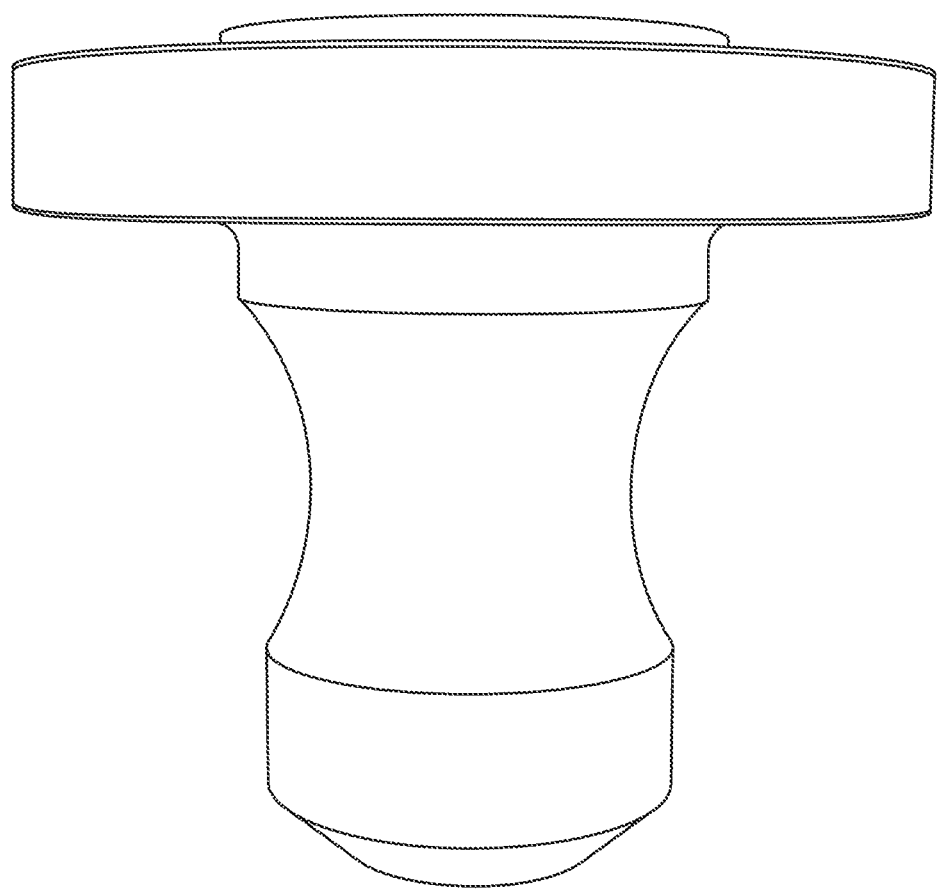
FIG. 12 is a side perspective view of another embodiment of a flanged fitting.
Figure 13:
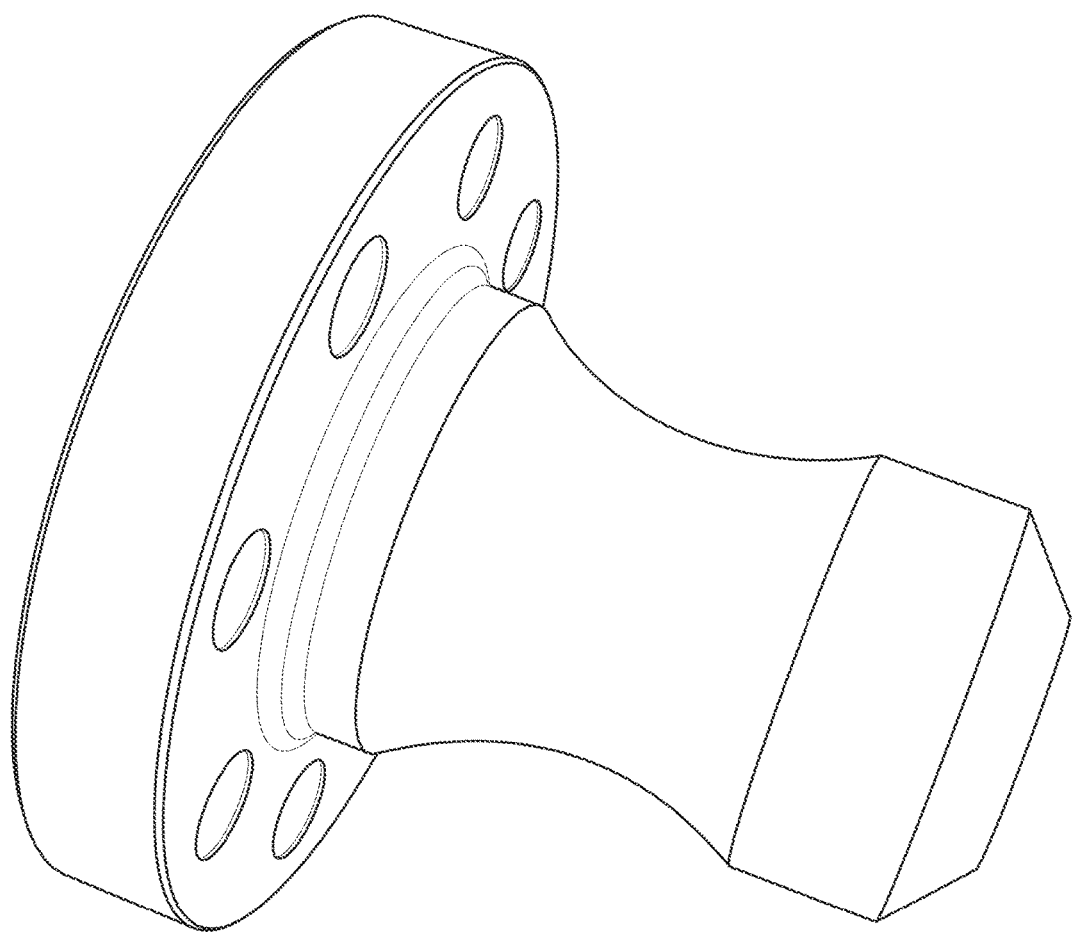
FIG. 13 is another side perspective view of the flanged fitting of FIG. 12.
Figure 14:
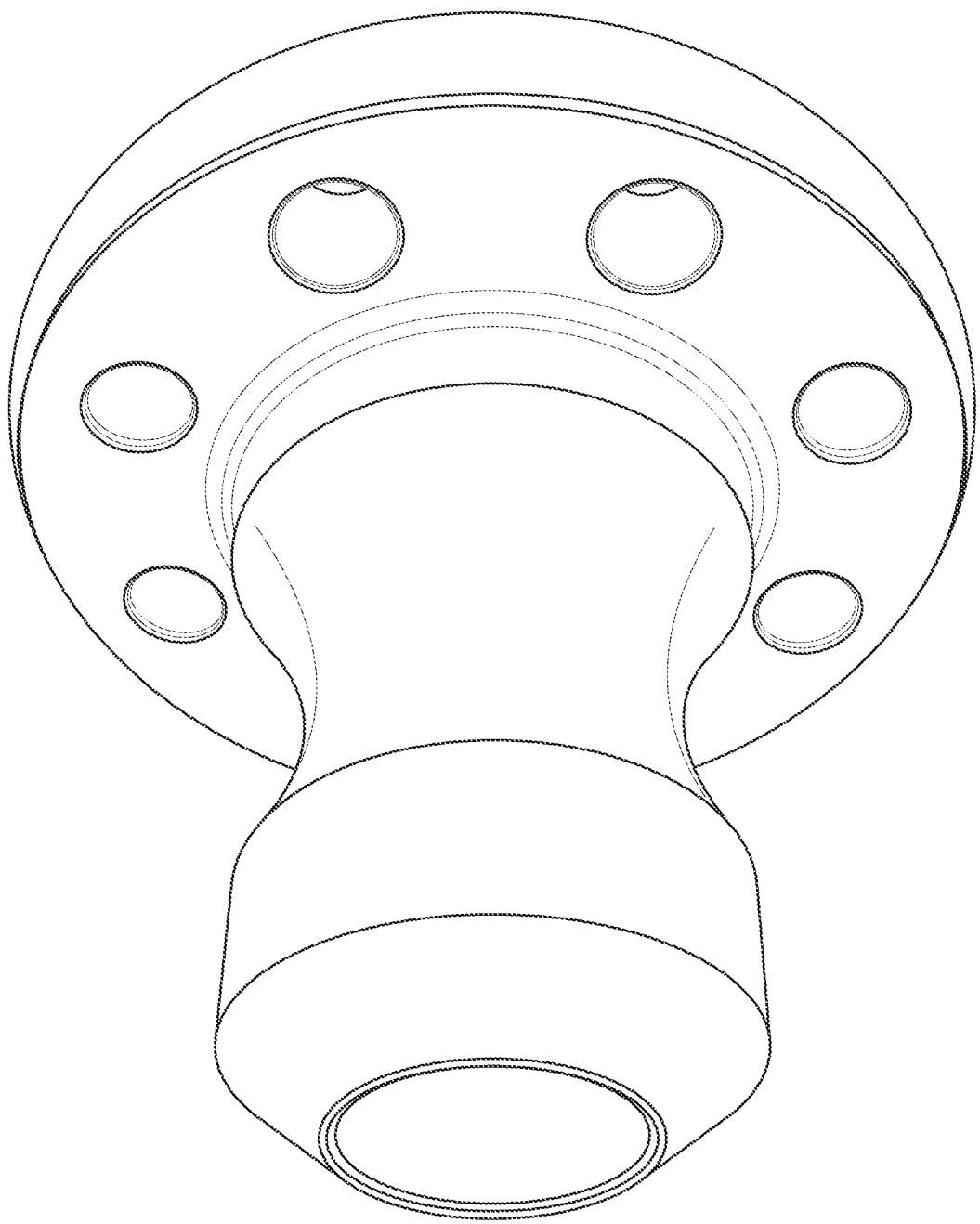
FIG. 14 is a bottom/side perspective view of the flanged fitting of FIG. 12.
Figure 15:
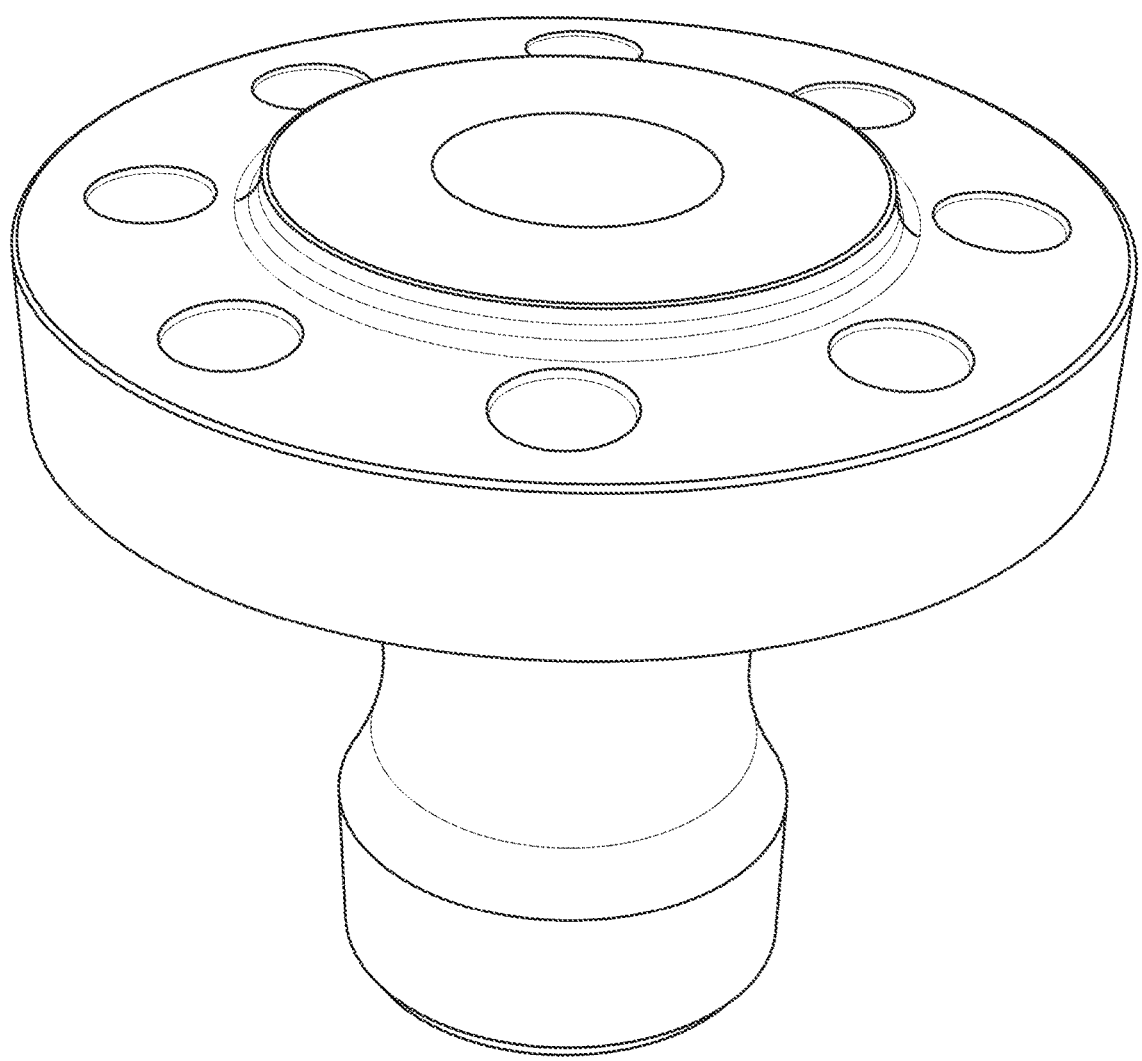
FIG. 15 is a top/side perspective view of the flanged fitting of FIG. 12.
Figure 16:
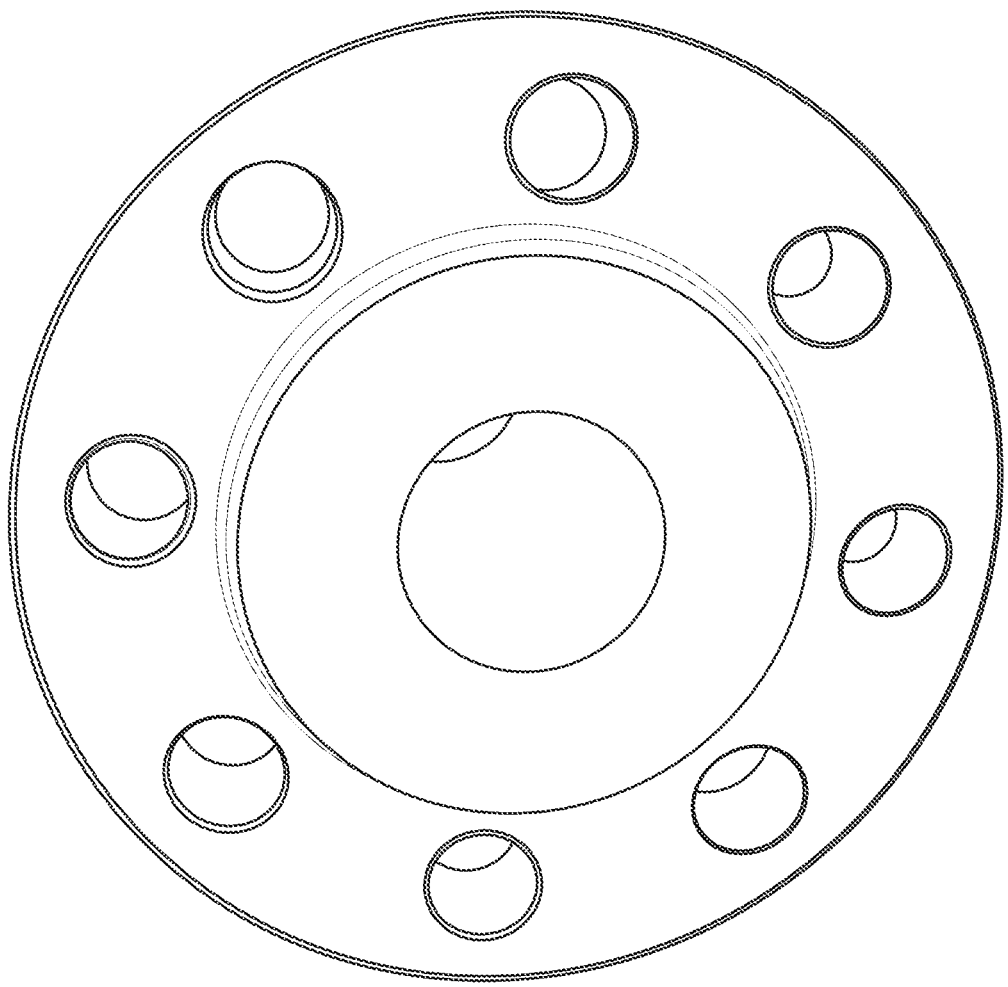
FIG. 16 is a top perspective view of the flanged fitting of FIG. 12.
Figure 17:
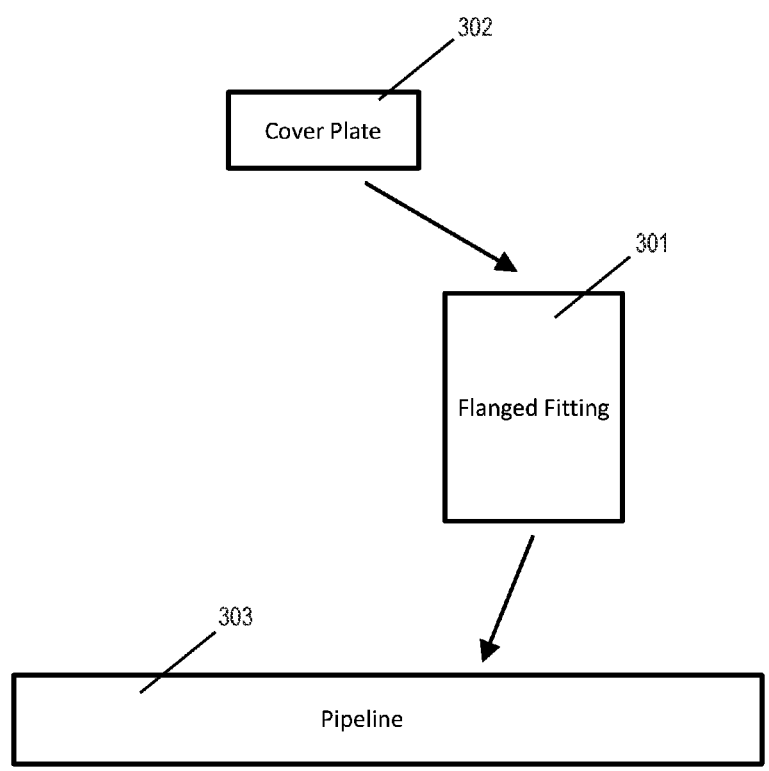
FIG. 17 is a graphical illustration of the functional features associated with using the flanged fitting of the disclosure.

In one embodiment, and with reference to FIGS. 1 and 6, the inner surface of the fitting includes an inner threaded surface. For example, the central opening (30, 230) has an inner wall with inner threaded surface (34, 234) capable of receiving a threaded plug. The inner threaded surface (34, 234) can be formed between inner non-threaded surface (36, 236) and inner non-threaded surface (38, 238), which meet the proximal and distal ends, respectively. The inner threaded surface (34, 234) can also be closer to the proximal end (12, 212) of the fitting. For example, the inner threaded surface (34, 234) can be present at a location in the central opening at a distance from the proximal end (12, 212) that is between about 5% to about 35%, or about 10% to about 30% of the overall length of the fitting (i.e., the distance from the proximal to distal end of the fitting). In embodiments, the length of the inner threaded surface (38, 238) is in the range of about 0.75 inches to about 1.25 inches, such as about 1 inch.

In other embodiments (e.g., as reflected in FIG. 5), an inner threaded surface is not required. For example, the central opening 130 can have a continuous non-threaded surface 136 from the proximal end 112 to the distal end 166.

The inner surface of the central opening (30, 130, 230) can be parallel to the central axis over most or all of its length. The inner diameter of the central opening (30, 130, 230) will be constant over lengths where the inner wall is parallel to the central axis. The inner diameter of the central opening (30, 130, 230) can be sized to accommodate a desired object (e.g., one that is introduced into a pipeline through the central opening of the fitting), such as a plug, pig, or other article used in a hot tapping process. The inner diameter can be sized to provide a desired flow of material through the fitting. The inner diameter can be similar, or the same, over most or all of the length of the central opening. In exemplary embodiments, the inner diameter in the range of about 1.5 inches to about 2.0 inches, such as about 1.74 inches. In some embodiments the inner diameter slightly decreases in step wise manner from the proximal to distal end. For example, with reference to FIGS. 1 and 5, the inner non-threaded surface (36, 236) has a greater inner diameter than inner non-threaded surface (38, 238).

In some embodiments, the inner wall is at an angle to the central axis in raised portion (22, 122, 222) causing an increase in the inner diameter of the central opening (30, 130, 230) near the proximal end of the fitting (not shown).

Adjacent and distal to the distal surface (18, 118, 218) of flange portion (10, 110, 210) is outer vertical surface (35, 135, 235). A curved transition surface can be between distal surface (18, 118, 218) and (outer) vertical surface (35, 135, 235).

Figure 5:
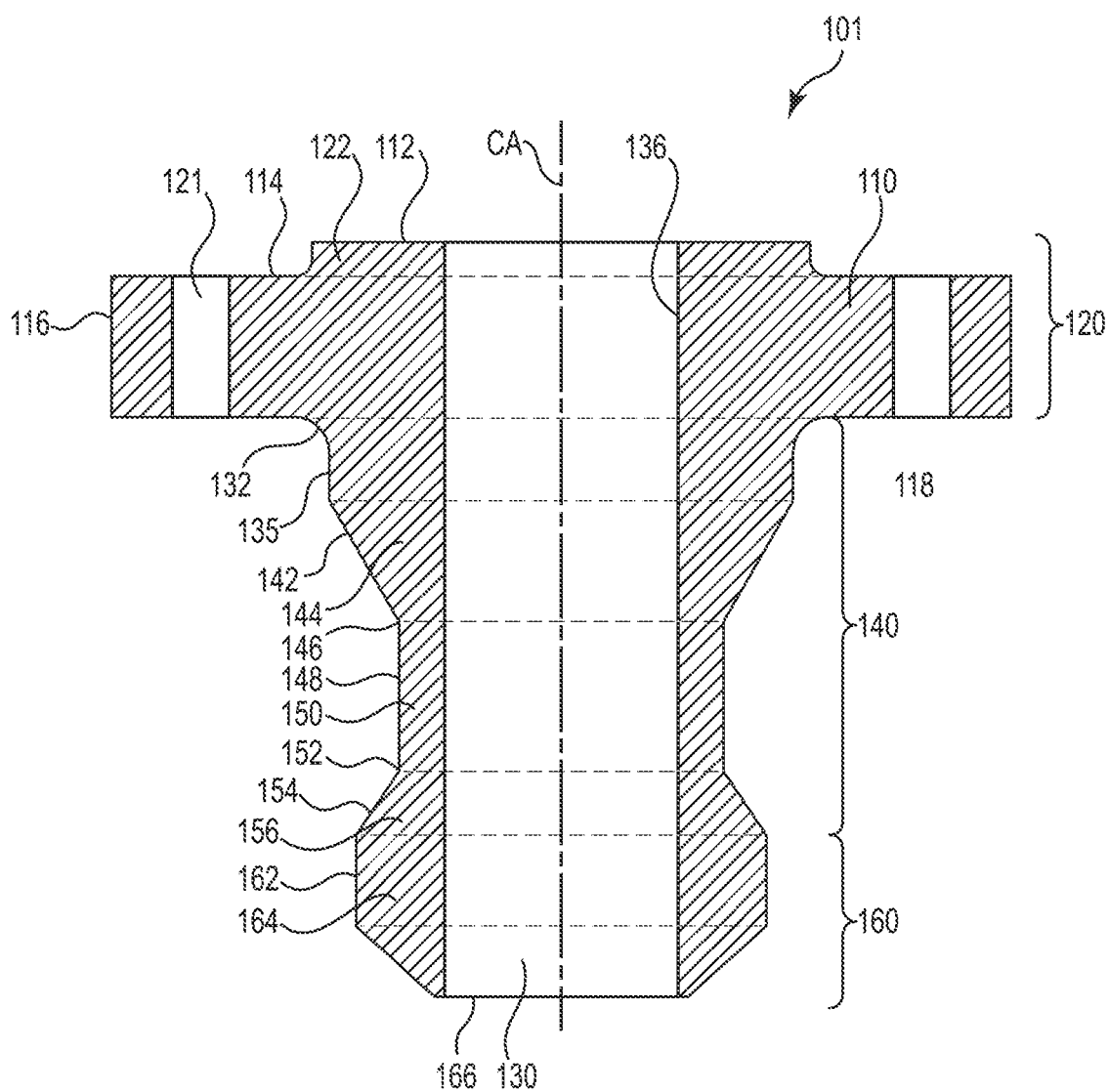
FIG. 5 is a side cross-sectional view of an embodiment of a flanged fitting.

In some embodiments, with reference to FIGS. 1 and 5, adjacent and distal to the vertical surface (35, 135) is angled outer surface (42, 142), which is at an angle relative to the central axis. As shown in the side cross-sectional views of FIGS. 1 and 5 of the flanged fitting, the angled outer surface (42, 142) is seen as a straight line. Angled outer surface (42, 142) defines a first section of fitting wall (44, 144) between the inner surface that decreases in thickness in a proximal to distal direction in the fitting.

In some embodiments of the fitting, with reference to FIG. 6, there is a curved surface 246 of substantial length between outer vertical surface 235 and vertical surface 248. For example, the curved surface can begin at a distal point of vertical surface 236 and can continue to the proximal point of vertical surface 248. The curve of the curved surface 246 can follow a portion of a curved object, such as an arc of a circle or oval. For example, the curved surface 246 can follow the arc of a circle having a certain radius, such as in the range of about 0.5 to about 3 inches, about 1 to about 3 inches, about 1.5 to about 2.5 inches, or more specifically 1.75 to about 2.25 inches. An exemplary radius of curved surface 246 is about 2.0 inches. Curved surface 246 can also defines a first section of fitting wall 244 between the inner surface that decreases in thickness in a proximal to distal direction in the fitting.

Referring back to FIGS. 1 and 5, adjacent and distal to the angled outer surface (42, 142) is vertical surface (48, 148). Referring to FIG. 6, adjacent and distal to curved surface 246 is vertical surface 248. Vertical surface (48, 148, 248) is parallel to the central axis and defines a second section of fitting wall (50, 150, 250) between the inner surface that is constant in thickness. This section of fitting wall represents the thinnest section of fitting wall along the length of the fitting, and in some embodiments has a thickness in the range of about 0.3 inches to about 0.4 inches, such as about 0.35 inch, and a length of about 1.5 inches to about 3 inches, such as about 2.2 inches.

The length of the vertical surface (48, 148, 248) (as measured along the central axis) can vary in embodiments of the inventive fitting. In some embodiments the length of the vertical surface can be in the range of about 0.25 inches to about 2.5 inches, or about 0.8 inches to about 2.5 inches. In exemplary embodiments, with reference to FIG. 5, the length of the vertical surface 148 is about 1.0 inches, and with reference to FIG. 5, the length of the vertical surface 48 is about 2.2 inches. In other exemplary embodiments, with reference to FIG. 6, the length of the vertical surface 248 is about 0.35 inches.

The thickness of section of fitting wall (50, 150, 250) can optionally be described in relation to the inner diameter of the central opening (30, 130, 230). For example, in some embodiments, the section of fitting wall (50, 150, 250) has a thickness that is in the range of about 15-25% of the inner diameter of the central opening, such as about 20% of the inner diameter.

In some embodiments, with reference to FIGS. 1 and 5, adjacent and distal to vertical surface (48, 148) is angled outer surface (54, 154), which is at an angle relative to the central axis. As shown in the side cross-sectional views of FIGS. 1 and 5 of the flanged fitting, like angled outer surface (42, 142), angled outer surface (54, 154) is also seen as a straight line. Angled outer surface (54, 154) defines a third section of fitting wall (56, 156) between the inner surface that increases in thickness in a proximal to distal direction in the fitting.

Optionally, the angled outer surface (54, 154) may be described by its angle relative to the central axis. For example, in some embodiments, angled outer surface (54, 154) is at an angle in range of about 28° to about 38° to the central axis, such as about 32°, 33°, or 34° to the central axis.

In some embodiments of the fitting, with reference to FIG. 6, there is a curved surface 252 of substantial length between outer vertical surface 248 and vertical surface 262. Like curved surface 246, the curve of the curved surface 252 can follow a portion of a curved object, such as an arc of a circle or oval and can follow the arc of a circle having a certain radius, such as in the range of about 0.5 to about 3 inches, about 1 to about 3 inches, about 1.5 to about 2.5 inches, or more specifically 1.75 to about 2.25 inches. An exemplary radius of curved surface 252 is about 2.0 inches. In some arrangements, curved surface 252 has the same radius as curved surface 246. However, in other arrangements, curved surface 252 may have a radius that is greater, or less, than the radius of curved surface 246. If different, this would result in a length of the corresponding section 256 that is greater or less, respectively than the length of the section 244, as measured along the central axis. Curved surface 252 defines a third section of fitting wall 256 between the inner surface that increases in thickness in a proximal to distal direction in the fitting.

In some embodiments, with reference to FIGS. 1 and 5, between the angled outer surface (42, 142) and the outer vertical surface (48, 148), and between the outer vertical surface (48, 148) and the angled outer surface (54, 154), are curved transition surface (46, 146) and curved transition surface (52, 152), respectively. The curved transition surface (52, 152) is shown in greater detail in FIG. 4. Curved transition surface (46, 146) is not shown in FIG. 4, but can be similar or the same as the second transition surface (52, 152). The curved transition surfaces can be formed by having the vertical surface (48, 148) curve into the angled surfaces (42, 142) and (54, 154), and this results in more fitting material present at the transition surface locations. The increase in fitting material can be seen between the curved transition surface (52, 152) and the dashes lines (otherwise representing this portion of the fitting without a curved transition surface). The presence of the curved transition surfaces (46, 146) and (52, 152) enhances the structural integrity of the fitting. In turn, this can allow a fitting to be formed with a bulkier distal portion (60, 160) such as according to those embodiments described here. The bulkier portion (distal section) of the fitting can be present without risking fracture of the fitting in the central portion (40, 140).

The curve of the curved transition surfaces (46, 146) and (52, 152) can follow a portion of a curved object, such as an arc of a circle or oval. For example, of the curved transition surfaces (46, 146) and (52, 152) can follow the arc of a circle having a certain radius, such as in the range of about 0.1 to about 0.15 inch.

Similar to the benefits that the curved transition surfaces (46, 146) and (52, 152) of the fitting embodiments show in FIGS. 1 and 5 provide, curved surfaces 246 and 252 of the fitting embodiment show in FIG. 6 enhances the structural integrity of the fitting. In turn, this can allow a fitting to be formed with a bulkier distal portion 260, without risking fracture of the fitting in the central portion 240.

As a general matter, the distal section (60, 160, 260) of the fitting, when viewed relative to the central section, can have a bulging or bulbous shape. For example, at least a part of the distal section can have a greater outer diameter and greater wall thickness relative to the central section (40, 140, 240). The distal section (60, 160, 260) can include one or more surfaces angled relative to the central axis, a vertical surface (parallel to the central axis), and combinations thereof.

In one embodiment, the distal section (60, 160, 260) comprises a vertical surface (62, 162, 262) parallel to the central axis defining a section of fitting wall (64, 164, 264) between the inner surface that is constant in thickness. The section of fitting wall (64, 164, 264) of the distal section (60, 160, 260) has a thickness that is greater than a thickness of the section of fitting wall (50, 150, 250) in the central section (40, 140, 240). Also, the outer diameter of the section of fitting wall (64, 164, 264) is greater than the outer diameter of the section of fitting wall (50, 150, 250). In some embodiments, the section of fitting wall (64, 164, 264) in the distal section (60, 160, 260) has a thickness that is about 1.8 to about 2.0 times (e.g., about 1.9 times) the thickness of fitting wall (50, 150, 250).

The length of the vertical surface (62, 162, 262) (as measured along the central axis) can vary in embodiments of the inventive fitting. In some embodiments the length of the vertical surface can be in the range of about 0.5 inches to about 1.25 inches. In exemplary embodiments, and with reference to FIG. 5, the length of the vertical surface (162) is about 0.67 inches, or, with reference to FIGS. 1 and 6, about 1.05 inches (62, 262).

The thickness of section of fitting wall (64, 164, 264) can optionally be described in relation to the inner diameter of the central opening (30, 130, 230). For example, in some embodiments, the section of fitting wall (64, 164, 264) is in the range of about 35-45% of the inner diameter of the central opening, such as about 40% of the inner diameter.

The fitting is preferably prepared by a method such as casting, forging, or machining, or a combination of such methods, and most preferably is formed by machining. Portions of, or all of the fitting may be described as "non-welded," meaning that a welding process is not performed in making the fitting. In preferred embodiments the fitting is made from a single piece of stock material. The fitting can be made from any suitable stock material, such as stainless steel, carbon steel, alloy steel, or other suitable material. In preferred embodiments, the fitting is made from the same material.

Embodiments of the invention include the flanged fitting along with a threaded plug (e.g., completion plug) capable of being screwed into an inner threaded surface 34 or 234, with reference to FIGS. 1 and 6, respectively. The threaded plug can include a central opening through the plug, and the central opening can be square or rectangular in shape.

Figure 18:
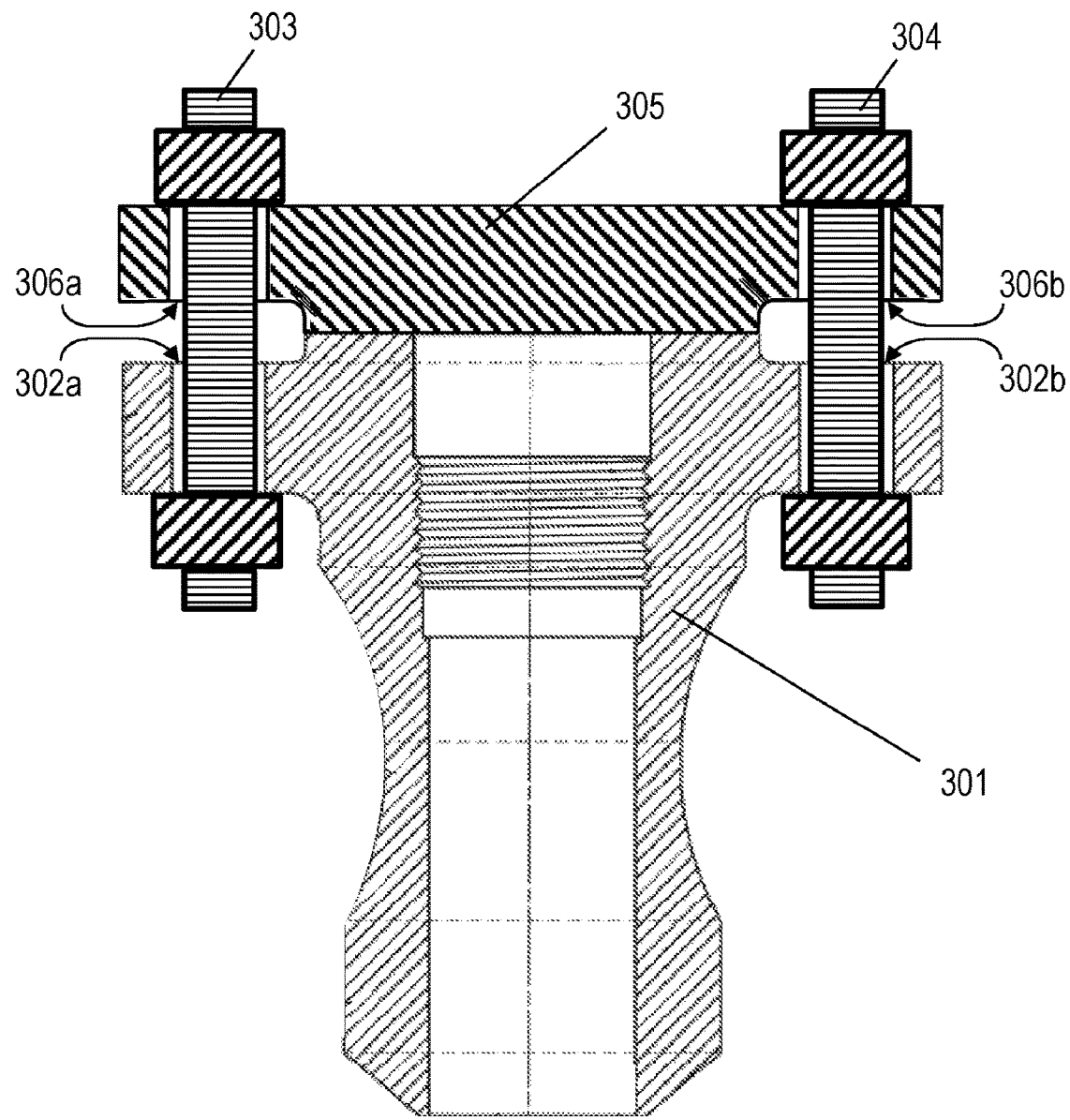
FIG. 18 is a side cross-sectional view of the flanged fitting of FIG. 6 and an attached cover plate.

With reference to FIG. 18, embodiments of the invention also include the flanged fitting 301 along with a cover plate 305 attachable to the proximal end of the fitting and having bolt holes (306*a*, 306*b*) in alignment with the bolt holes (302*a*, 302*b*) of the fitting.

In some modes of operation, the flanged fitting may be used in a line stop assembly to seal an opening tapped into a pipeline. The line stop assembly can include the flanged fitting, a pipeline sleeve, and a cover plate. The pipeline sleeve can be formed from two sleeve portions that can be welded, or otherwise coupled, to the pipeline. The flanged fitting can be coupled (e.g., by welding) to a sleeve portion. The fitting can be positioned on the pipeline so a bore in the flange is aligned and in fluid communication with a tapped opening in the pipeline.

In some modes of operation, the distal end of the fitting can be welded onto a pipeline to surround an opening therein. In some uses, the distal end of the fitting is welded onto a pipeline and then a hot tap is made in the pipeline through the opening. In use, the flanged fitting can be connected to a tapping valve, and further connected to various mechanisms such as hot tapping machines, plugging machines, etc. Through the central opening of the fitting can be passed cutting tools, plugs, and the like, an optionally into the pipeline.

The completion plug can be inserted into the central opening of the fitting to provide a primary seal of the tapped opening, thereby inhibiting release of any pressurized fluid in the pipeline from the central opening of the fitting. The cover plate can also be coupled to the flange portion using a set of bolts (303, 304), as shown in FIG. 18. The cover plate can prevent contact (e.g., of debris or other object) with the completion plug.

What is claimed is:

1. A flanged fitting comprising:
   proximal, central, and distal sections between proximal and distal ends of the fitting;
   wherein the proximal section comprises a flange portion having a circumference, proximal, first vertical, and distal surfaces, and a plurality of bolt holes extending through the flange portion from its proximal surface to distal surface, wherein the plurality of bolt holes are circumferentially arranged in the flange portion;
   a central opening extending from the proximal to distal end of the fitting and having a central axis, the opening having an inner surface, wherein the inner surface comprises an inner threaded surface positioned between a first inner non-threaded surface and a second inner non-threaded surface, wherein the inner threaded surface is capable of receiving a threaded plug and is closer to the proximal end than the distal end;
   the central section having a tubular shape and comprising, in a proximal to distal arrangement: a first curved outer surface defining a first section of fitting wall between the inner surface that decreases in thickness; a second vertical surface, parallel to the central axis and defining a second section of fitting wall between the inner surface that is constant in thickness; and a second curved surface defining a third section of fitting wall between the inner surface that increases in thickness;
   the distal section comprising a third vertical surface parallel to the central axis defining a fourth section of fitting wall between the inner surface that is constant in thickness;
   wherein the fourth section of fitting wall has an outer diameter and thickness that is greater than a thickness of an outer diameter and thickness of the second section of fitting wall;
   wherein the inner threaded surface begins at a location on the inner surface corresponding to the flange portion and ends at a location on the inner surface corresponding to the first curved outer surface of the central portion.

2. The flanged fitting of claim 1 further comprising a raised portion that extends proximally from the flange portion, the raised portion having a circumference that is smaller than the flange circumference.

3. The flanged fitting of claim 1 further comprising a third angled outer surface angled relative to the central axis and defining a fifth section of fitting wall between the inner surface that decreases in thickness.

4. The flanged fitting of claim 3 wherein, as measured along the central axis, a combined length of the third, fourth, and fifth sections of the fitting wall are less than the length of the second section of fitting wall.

5. The flanged fitting of claim 1 wherein the thickness of the fourth section of fitting wall is about 1.8—about 2.0 times the thickness of the of the second section of fitting wall, wherein the central opening has an inner diameter, and the thickness of the second section of fitting wall is in the range of about 15-25% of the inner diameter, and the thickness of the fourth section of fitting wall is in the range of about 35-45% of the inner diameter.

6. The flanged fitting of claim 5 wherein the thickness of the fourth section of fitting wall is about 1.9 times the thickness of the second section of fitting wall, the thickness of the second section of fitting wall is about 20% of the inner diameter, and the thickness of the fourth section of fitting wall is about 40% of the inner diameter.

7. The flanged fitting of claim 1 wherein the second section of fitting wall has an outer diameter that is smaller than the outer diameter of any section of the fitting having a constant wall thickness.

8. A system comprising the flanged fitting of claim 1, a cover plate attachable to the proximal end of the fitting and having bolt holes in alignment with the bolt holes of the fitting.

9. The flanged fitting of claim 1 wherein the inner threaded surface is present at a location in the central opening at a distance from the proximal end that is between about 5% to about 35% of the overall length of the fitting.

10. The flanged fitting of claim 1 wherein the curved surfaces of the central section comprising the first and second outer surfaces comprise majority of the length of the central section.

11. A system comprising a flanged fitting and a threaded plug capable of being screwed into an inner threaded surface, wherein the flanged fitting comprises:
proximal, central, and distal sections between proximal and distal ends of the fitting;
wherein the proximal section comprises a flange portion having a circumference, proximal, first vertical, and distal surfaces, and a plurality of bolt holes extending through the flange portion from its proximal surface to distal surface, wherein the plurality of bolt holes are circumferentially arranged in the flange portion;
a central opening extending from the proximal to distal end of the fitting and having a central axis, the opening having an inner surface, wherein the inner surface comprises an inner threaded surface positioned between a first inner non-threaded surface and a second inner non-threaded surface, wherein the inner threaded surface is capable of receiving a threaded plug and is closer to the proximal end than the distal end;
the central section having a tubular shape and comprising, in a proximal to distal arrangement: a first curved outer surface defining a first section of fitting wall between the inner surface that decreases in thickness; a second vertical surface, parallel to the central axis and defining a second section of fitting wall between the inner surface that is constant in thickness; and a second curved surface defining a third section of fitting wall between the inner surface that increases in thickness;
the distal section comprising a third vertical surface parallel to the central axis defining a fourth section of fitting wall between the inner surface that is constant in thickness;
wherein the fourth section of fitting wall has an outer diameter and thickness that is greater than a thickness of an outer diameter and thickness of the second section of fitting wall;
and wherein the threaded plug provides a primary seal in the central opening of the flanged fitting and inhibits release of fluid through the central opening of the fitting.

12. A method for accessing a pipe comprising steps of (a) providing a fitting of claim 1, and (b) attaching the distal end of the fitting to a pipeline.

13. The method of claim 12 further comprising steps of forming an opening in a sidewall of a pipeline sized to accommodate the distal end of the fitting.

14. A flanged fitting comprising:
proximal, central, and distal sections between proximal and distal ends of the fitting;
wherein the proximal section comprises a flange portion having a circumference, proximal, first vertical, and distal surfaces, and a plurality of bolt holes extending through the flange portion from its proximal surface to distal surface, wherein the plurality of bolt holes are circumferentially arranged in the flange portion;
a central opening extending from the proximal to distal end of the fitting and having a central axis, the opening having an inner surface, wherein the inner surface comprises an inner threaded surface positioned between a first inner non-threaded surface and a second inner non-threaded surface, wherein the inner threaded surface is capable of receiving a threaded plug and is closer to the proximal end than the distal end;
the central section having a tubular shape and comprising, in a proximal to distal arrangement: a first angled outer surface angled relative to the central axis and defining a first section of fitting wall between the inner surface that decreases in thickness; a second vertical surface, parallel to the central axis and defining a second section of fitting wall between the inner surface that is constant in thickness; and a second angled outer surface angled relative to the central axis defining a third section of fitting wall between the inner surface that increases in thickness;
the central section further comprising a first curved transition surface between the first angled outer surface and the second outer vertical surface, and a second curved transition surface between the second outer vertical surface and the second angled outer surface,
the distal section comprising a third vertical surface parallel to the central axis defining a fourth section of fitting wall between the inner surface that is constant in thickness;
wherein the fourth section of fitting wall has an outer diameter and thickness that is greater than a thickness of an outer diameter and thickness of the second section of fitting wall;
and wherein the inner threaded surface begins at a location on the inner surface corresponding to the flange portion and ends a location on the inner surface corresponding to the first angled outer surface of the central section.

15. The flanged fitting of claim 14 wherein the second angled outer surface is at an angle in range of about 28° to about 38° to the central axis.

16. The flanged fitting of claim 15 wherein the second angled outer surface is at an angle of about 32°, 33°, or 34° to the central axis.

17. A system comprising the flanged fitting of claim 14 and a threaded plug capable of being screwed into an inner threaded surface, wherein the threaded plug provides a primary seal in the central opening of the flanged fitting and inhibits release of fluid through the central opening of the fitting.

18. A flanged fitting comprising:
- proximal, central, and distal sections between proximal and distal ends of the fitting;
- wherein the proximal section comprises a flange portion having a circumference, proximal, first vertical, and distal surfaces, and a plurality of bolt holes extending through the flange portion from its proximal surface to distal surface, wherein the plurality of bolt holes are circumferentially arranged in the flange portion;
- a central opening extending from the proximal to distal end of the fitting and having a central axis, the opening having an inner surface, wherein the inner surface comprises an inner threaded surface positioned between a first inner non-threaded surface and a second inner non-threaded surface,
- wherein the inner threaded surface is capable of receiving a threaded plug and is closer to the proximal end than the distal end,
- the central section having a tubular shape and comprising, in a proximal to distal arrangement: a first curved outer surface defining a first section of fitting wall between the inner surface that decreases in thickness; a second vertical surface, parallel to the central axis and defining a second section of fitting wall between the inner surface that is constant in thickness; and a second curved surface defining a third section of fitting wall between the inner surface that increases in thickness;
- the distal section comprising a third vertical surface parallel to the central axis defining a fourth section of fitting wall between the inner surface that is constant in thickness;
- wherein the fourth section of fitting wall has an outer diameter and thickness that is greater than a thickness of an outer diameter and thickness of the second section of fitting wall
- wherein the proximal section further comprises a curved transition surface and a second vertical surface between the distal surface of the flange portion and the first section of fitting wall of the central section, wherein the inner threaded surface extends a length along the inner surface traversing the curved transition surface and second vertical surface.

* * * * *

UNITED STATES PATENT AND TRADEMARK OFFICE
CERTIFICATE OF CORRECTION

PATENT NO. : 10,088,084 B2
APPLICATION NO. : 14/575601
DATED : October 2, 2018
INVENTOR(S) : John Anderson Page 1 of 1

It is certified that error appears in the above-identified patent and that said Letters Patent is hereby corrected as shown below:

In the Claims

Column 9
Line 7 "thickness of the of the" should be --thickness of the--.

Signed and Sealed this
Eleventh Day of December, 2018

Andrei Iancu
*Director of the United States Patent and Trademark Office*